United States Patent
Brodie et al.

(10) Patent No.: US 12,551,102 B2
(45) Date of Patent: Feb. 17, 2026

(54) SYSTEMS AND METHODS FOR PERIPHERAL RETINAL OPTICAL COHERENCE TOMOGRAPHY

(71) Applicant: DUKE UNIVERSITY, Durham, NC (US)

(72) Inventors: Frank Brodie, Durham, NC (US); Ryan McNabb, Durham, NC (US); Cynthia Toth, Durham, NC (US); Joseph Izatt, Durham, NC (US)

(73) Assignee: DUKE UNIVERSITY, Durham, NC (US)

( * ) Notice: Subject to any disclaimer, the term of this patent is extended or adjusted under 35 U.S.C. 154(b) by 775 days.

(21) Appl. No.: 17/792,762

(22) PCT Filed: Jan. 15, 2021

(86) PCT No.: PCT/US2021/013567
§ 371 (c)(1),
(2) Date: Jul. 14, 2022

(87) PCT Pub. No.: WO2021/146512
PCT Pub. Date: Jul. 22, 2021

(65) Prior Publication Data
US 2023/0053244 A1    Feb. 16, 2023

Related U.S. Application Data

(60) Provisional application No. 62/961,271, filed on Jan. 15, 2020.

(51) Int. Cl.
*A61B 3/10* (2006.01)
*A61B 3/00* (2006.01)
(Continued)

(52) U.S. Cl.
CPC .............. *A61B 3/125* (2013.01); *A61B 3/102* (2013.01); *A61B 3/14* (2013.01); *A61B 90/08* (2016.02);
(Continued)

(58) Field of Classification Search
CPC ......... A61B 3/02; A61B 3/102; A61B 3/1025; A61B 3/113; A61B 3/1015; A61B 3/103;
(Continued)

(56) References Cited

U.S. PATENT DOCUMENTS 8,070,289 B2   12/2011  Peyman
9,936,868 B2    4/2018  Izatt et al.
(Continued)

OTHER PUBLICATIONS

Brodie, Frank et al., "Ex vivo evaluation of the peripheral retina utilizing a mirrored contact with optical coherence tomography," Investigative Ophthalmology & Visual Science, Jun. 2021, pp. 3104 (1-3), vol. 62, issue 8, The Association for Research in Vision and Ophthalmology.

(Continued)

*Primary Examiner* — Dawayne Pinkney
(74) *Attorney, Agent, or Firm* — Talem IP Law, LLP

(57) ABSTRACT

Peripheral retinal OCT can be used to generate peripheral retinal OCT images allowing for the peripheral retina to be viewed. A peripheral retinal vision system can determine that a set of fiducial markers is in a field-of-view of at least one camera and record positional data comprising a contact lens position and angle with respect to an OCT imaging system having OCT scanning mirrors in a first position. The system can determine whether a retinal layer is in an OCT scan captured while the set of fiducial markers is in the field-of-view of the at least one camera and the OCT scanning minors are in the first position; and for an OCT scan having he retinal layer and being captured while the set of fiducial markers is in the field-of-view of the at least one (Continued)

camera and the OCT scanning minors are in the first position, store that OCT scan.

20 Claims, 8 Drawing Sheets

(51) Int. Cl.
    *A61B 3/02*       (2006.01)
    *A61B 3/117*     (2006.01)
    *A61B 3/125*     (2006.01)
    *A61B 3/14*       (2006.01)
    *A61B 90/00*     (2016.01)
    *G02C 7/04*      (2006.01)

(52) U.S. Cl.
    CPC ...... *A61B 90/39* (2016.02); *A61B 2090/3937* (2016.02)

(58) Field of Classification Search
    CPC ..... A61B 3/117; A61B 3/1225; A61B 3/0075; A61B 3/024; A61B 3/005
    USPC ... 351/159.02, 200, 205–206, 208–211, 219, 351/221–223, 246, 41, 245
    See application file for complete search history.

(56) References Cited

U.S. PATENT DOCUMENTS

| | | | |
|---|---|---|---|
| 10,674,906 B2* | 6/2020 | Kalina, Jr. | A61B 17/0231 |
| 11,026,860 B2* | 6/2021 | Andersen | A61F 9/00781 |
| 2010/0091244 A1* | 4/2010 | Volk | A61B 3/117 351/219 |
| 2011/0025979 A1 | 2/2011 | Chehab et al. | |
| 2013/0072917 A1* | 3/2013 | Kaschke | A61F 9/00736 606/6 |
| 2013/0102895 A1 | 4/2013 | Gooding et al. | |
| 2014/0354951 A1 | 12/2014 | Izatt et al. | |
| 2015/0202083 A1 | 7/2015 | Takeda et al. | |
| 2016/0338589 A1 | 11/2016 | Carrasco-Zevallos et al. | |
| 2017/0112433 A1 | 4/2017 | Pugh et al. | |
| 2018/0289256 A1 | 10/2018 | Murata et al. | |

OTHER PUBLICATIONS

Kolb, Jan Philip et al., "Ultra-widefield retinal MHz-OCT imaging with up to 100 degrees viewing angle," Biomedical Optics Express, May 1, 2015 (Accessible Apr. 2, 2015), p. 1534-52, vol. 6, issue 5.

Choudhry, Netan et al., "Taking OCT Out to The Retinal Periphery," Retina Specialist, Sep. 20, 2016, 8 pages.

Gresores, Nathan Joseph et al., "Evaluation of a combined ultra-wide field SLO with SD OCT," Investigative Ophthalmology & Visual Science, Jul. 13, 2018 (Presented May 3, 2018), p. 664 (2 pages), vol. 59, issue 9.

Yannuzzi, Nicolas A. et al., "Cost-Utility of Evaluation for Posterior Vitreous Detachment and Prophylaxis of Retinal Detachment," Ophthalmology, Jan. 2018, pp. 43-50, vol. 125, issue 1.

Coffee, Robert E. et al., "Symptomatic Posterior Vitreous Detachment and the Incidence of Delayed Retinal Breaks: Case Series and Meta-analysis," American Journal of Ophthalmology, Sep. 2007 (Accessible Jun. 20, 2007), pp. 409-413.e1, vol. 144, issue 3.

Fujimoto, James et al., "The Development, Commercialization, and Impact of Optical Coherence Tomography," Investigative Opthalmology & Visual Science, Jul. 13, 2016, pp. OCT1-OCT13, vol. 57, issue 9.

Swanson, Eric A. et al., "The ecosystem that powered the translation of OCT from fundamental research to clinical and commercial impact [Invited]," Biomedical Optics Express, Mar. 1, 2017 (Accessible Feb. 21, 2017), pp. 1638-1664, vol. 8, issue 3.

Mcnabb, Ryan P et al., "Wide field of view swept-source optical coherence tomography for peripheral retinal disease," British Journal of Ophthalmology, Oct. 2016 (Accessible Jan. 11, 2016), pp. 1377-1382, vol. 100, issue 10.

Choudhry, Netan et al., "Ultra-Widefield Steering-Based Spectral-Domain Optical Coherence Tomography Imaging of the Retinal Periphery," Ophthalmology, Jun. 2016 (Accessible Mar. 16, 2016), pp. 1368-1374, vol. 123, issue 6.

Mcnabb, Ryan P et al., "Complete 360° circumferential gonioscopic optical coherence tomography imaging of the iridocorneal angle," Biomedical Optics Express, Apr. 1, 2015 (Accessible Mar. 20, 2015), pp. 1376-1391, vol. 6, issue 4.

Carrasco-Zevallos, Oscar et al., "Real-time Ocular Pupil Tracking for Motion Corrected Ophthalmic Optical Coherence Tomography," Biomedical Optics, Apr. 2014, pp. BW4A-6, 3 pages, Optica Publishing Group.

Sanchez, Irene et al., "The parameters of the porcine eyeball," Graefe's Archive for Clinical and Experimental Ophthalmology, Apr. 2011 (Accessible Feb. 2, 2011), pp. 475-482, vol. 249, issue 4.

Xie, Wankun et al., "Correlation of spectral domain optical coherence tomography with histology and electron microscopy in the porcine retina," Experimental Eye Research, Dec. 2018 (Accessible Aug. 16, 2018), pp. 181-190, vol. 177.

Sebag, J., "Vitreous: in Health and Disease", Oct. 1, 2014, pp. xxi-xxviii, Springer, New York, NY.

International Search Report and Written Opinion Issued in International Application No. PCT/US2021/013567, mailed Mar. 25, 2021, 8 Pages.

\* cited by examiner

SYSTEMS AND METHODS FOR PERIPHERAL RETINAL OPTICAL COHERENCE TOMOGRAPHY

CROSS-REFERENCE TO RELATED APPLICATION(S)

This application is the U.S. National Stage Application of International Application No. PCT/US21/13567, filed Jan. 15, 2021, which claims the benefit of U.S. Provisional Application No. 62/961,271, which was filed Jan. 15, 2020.

BACKGROUND

"Flashes and floaters" are a frequent cause of visits to the eye doctor. These symptoms usually signify benign and normal separation of the vitreous gel from the retina. However, they can also indicate the first sign of a retinal tear, which can lead to retinal detachment. Retinal detachment is a serious ocular condition that can lead to severe vision loss and blindness. It cannot be treated with medication, and repair of the retinal detachment requires one or more surgeries. However, many retinal detachments and accompanying surgeries can be prevented if the retinal tear is identified and treated early. Therefore, patients reporting the above symptoms typically undergo careful examination of the retina to evaluate for retinal tear. The conventional examination is technically challenging, labor intensive, and uncomfortable to the patient. Further, the observations must be manually recorded or illustrated by the practitioner.

BRIEF SUMMARY

Systems and methods providing peripheral retinal optical coherence tomography ("OCT") are described. Through the described systems and methods, peripheral retinal OCT images can be generated allowing for the circumferential peripheral retina of an eye to be viewed. The peripheral retinal OCT image can also provide visualization of the vitreoretinal attachment and preretinal tissue and changes in the vitreous and vitreoretinal interface, such as partial vitreous separation, along with traction to the preretinal tissue and/or retina.

A peripheral retinal OCT system for imaging an eye of a subject can include an OCT imaging device comprising a light source, a beam steering mechanism, and a focusing lens; a contact lens for placing on the eye comprising one or more angled mirrors; and an orientation system for determining positional data comprising a position of the contact lens and an angle of the contact lens with respect to the OCT imaging device, which is in communication with the OCT imaging device, wherein the system is configured to visualize an internal periphery of the eye.

A peripheral retinal vision system can determine that a set of fiducial markers is in a field-of-view of at least one camera and record positional data comprising a position of a contact lens and an angle of the contact lens with respect to an optical coherence tomography (OCT) imaging system having OCT scanning mirrors in a first position. The peripheral retinal vision system can determine whether a retinal layer is in an OCT scan captured while the set of fiducial markers is in the field-of-view of the at least one camera and the OCT scanning mirrors are in the first position; and for an OCT scan having the retinal layer and being captured while the set of fiducial markers is in the field-of-view of the at least one camera and the OCT scanning mirrors are in the first position, store that OCT scan.

The peripheral retinal vision system can obtain positional data of a contact lens with respect to an OCT imaging system while the OCT imaging system is capturing corresponding OCT scans, the positional data being obtained while a set of fiducial markers is in a field-of-view of at least one camera. The peripheral retinal vision system can provide positional data and with the corresponding captured OCT scans generate a peripheral retinal OCT image; repositioning of the peripheral retinal OCT image can allow for an circumferential peripheral retina of an eye to be viewed.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1C:
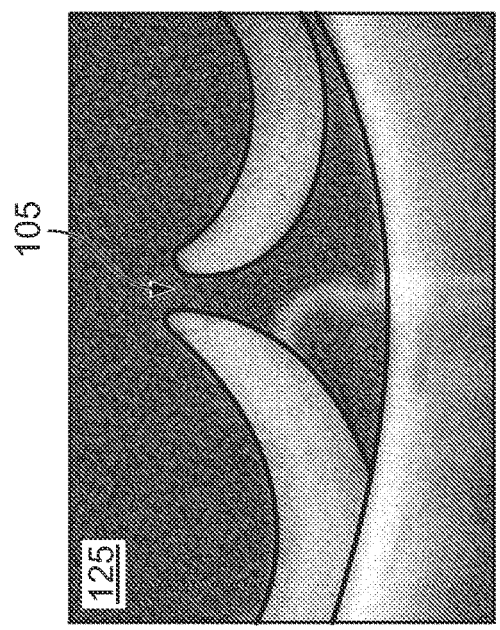
FIGS. 1B and 1C show examples for comparison between the peripheral retinal tear of FIG. 1A viewed during a conventional eye exam and the peripheral retinal tear of FIG. 1A viewed using peripheral retinal OCT.

Systems and methods providing peripheral retinal optical coherence tomography ("OCT") are described. Through the described systems and methods, peripheral retinal OCT images can be generated allowing for the circumferential peripheral retina of an eye to be viewed. The peripheral retinal OCT image can also provide visualization of the vitreoretinal attachment and preretinal tissue and changes in the vitreous and vitreoretinal interface, such as partial vitreous separation, along with traction to the preretinal tissue and/or retina.

For the purposes of promoting an understanding of the principles of the present disclosure, reference will now be made to preferred embodiments and specific language will be used to describe the same. It will nevertheless be understood that no limitation of the scope of the disclosure is thereby intended, such alteration and further modifications of the disclosure as illustrated herein, being contemplated as would normally occur to one skilled in the art to which the disclosure relates.

As used herein, the term "subject" and "patient" are used interchangeably herein and refer to both human and nonhuman animals. The term "nonhuman animals" of the disclosure includes all vertebrates, e.g., mammals and non-mammals, such as nonhuman primates, sheep, dog, cat, horse, cow, chickens, amphibians, reptiles, and the like. The methods and compositions disclosed herein can be used on a sample either in vitro (for example, on isolated cells or tissues) or in vivo in a subject (i.e. living organism, such as a patient).

Unless otherwise defined, all technical terms used herein have the same meaning as commonly understood by one of ordinary skill in the art to which this disclosure belongs.

Retinal detachment is a serious ocular condition that can lead to severe vision loss and blindness. However, many retinal detachments can be prevented if the causative break or tear in the retina is identified early and treated with a simple office-based procedure. Generally, the initial retinal tear occurs when the vitreous humor begins to collapse in on itself and separate from the retina. Areas of abnormal adhesion between the vitreous and retina cause the retina to tear as the vitreous pulls away. This tear allows fluid to come behind the retina, and the retina detaches.

Separation of the vitreous gel is a normal phenomenon of aging. Even without an associated retinal tear, the process of separation of the vitreous gel can cause symptoms of flashes and floaters which leads people to seek evaluation from an eye doctor. Approximately 150,000 eye exams for flashes and floaters are performed annually in the US. The observation of tears is not uncommon, with approximately 8-10% of patients who have had flashes and floaters ultimately having a small retinal tear. At this point, if a small retinal tear is found it can be treated in the office with laser retinopexy (i.e., essentially tacking down the surrounding retina) to prevent a full retinal detachment from forming.

In a conventional eye exam for inspecting the peripheral interior area of the eye to look for retinal tears, a technique called scleral depressed indirect ophthalmoscopy is performed. In this procedure, the ophthalmologist uses a metal pen-like instrument to press down a small region of sclera (i.e., the external white part of the eye) so that the retina is viewable through the pupil by a condensing lens. This is repeated around the entire eye to provide a complete view of the retinal periphery (i.e., the retina and associated structures). Because retinal breaks can occur in the far periphery of the retina, the exam to find any breaks is both challenging for the eye doctor and uncomfortable for the patient. Without scleral depression it is not possible to see the periphery through the pupil and appreciate the three-dimensional nature of a retinal tear. Indirect ophthalmoscopy without scleral depression is insufficient.

Further, there is considerable technical skill involved in performing a scleral depressed exam and experienced ophthalmologists may struggle with it. Even with a good exam, it can be very challenging to identify a retinal tear. A tear of only 0.1 mm can be pathologic and cause retinal detachment. Additionally, in these conventional exams, the findings cannot be digitally recorded. The eye doctor must write or draw the findings from memory after the examination.

OCT is a commonly used method of retinal imaging, which provides a practitioner with a high-resolution retinal image. The image can be obtained in seconds without any patient discomfort using non-visible near infrared light. OCT relies on the principles of low coherence interferometry to evaluate the backscattering of light from cellular structures within the semitransparent retina and uses a series of rapid scans (>10,000/second) to develop a high resolution cross-sectional image of the retina that closely mirrors a histological section of the retina. This non-invasive, non-radiation based imaging modality is used to diagnose and monitor common conditions such as diabetic retinopathy and macular degeneration as well as a host of other ophthalmic diseases.

One drawback to current OCT imaging is that the field-of-view (FOV) is limited. Hence, due to the geometry of the eye, the far peripheral locations of early retinal detachments may be optically inaccessible. The solution proposed herein is to combine OCT with gonioscopic lenses that are placed on the patient's cornea and externally illuminated to provide a wider FOV through the use of mirrors and/or prisms and which overcome total internal reflection (TIR) of light. This provides a method to visualize sub-surface anatomical structures and the ability to record the information beyond drawings or notes provided by the ophthalmologist.

The system and method disclosed herein enables a peripheral eye exam to be conducted that is performed using OCT to provide micron-level resolution images of the entire peripheral retinal without scleral depression. The cross-sectional, volumetric imaging of the peripheral retina generates digital images which can be referenced in the monitoring and treatment of the retina. This advantageously makes the exam faster and easier for the practitioner as well as reducing discomfort for the patient. The solution can also reduce costs while improving population health through earlier detection and treatment of retinal tears. Further, the disclosed method can be performed by a technician, and the clinician needs only to review the images and document an impression.

The method disclosed herein extends gonioscopic OCT methods to include imaging of the peripheral retina. By directing the OCT imaging beam through a mirrored lens and manipulating the focus and scan pattern, OCT images of the far periphery can be produced. Currently, angled mirrors can be used to manually visualize the peripheral retina, but the manual visualization does not capture the three-dimensional structural features necessary to detect retinal tears. However, by coupling the lens with the cross-sectional imaging capabilities of OCT, rapid, non-contact, high resolution imaging of the peripheral retinal is possible.

Figure 1B:
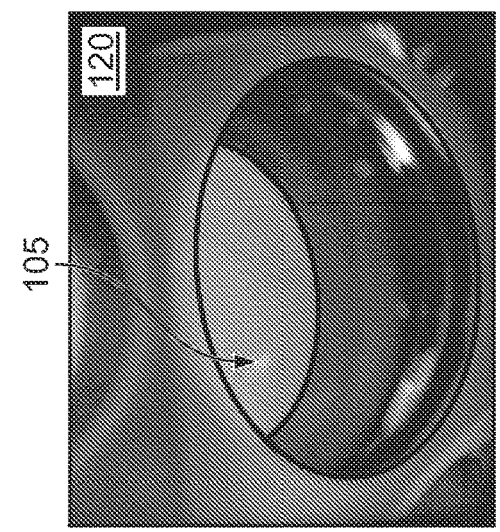
Figure 1A:
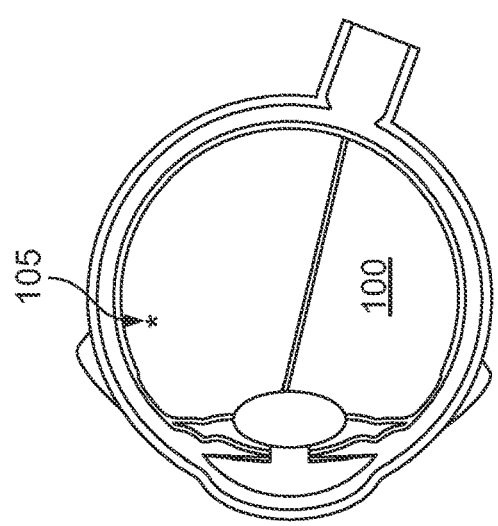
FIG. 1A shows a location of a retinal tear in a far periphery of an eye.

FIG. 1A shows a location of a retinal tear in a far periphery of an eye; and FIGS. 1B and 1C show examples for comparison between the peripheral retinal tear of FIG. 1A viewed during a conventional eye exam and the peripheral retinal tear of FIG. 1A viewed using peripheral retinal OCT. Referring to FIG. 1A, a retinal tear 105 is located in a far periphery of an eye 100.

Referring to FIG. 1B, the peripheral retinal tear 105 is shown in image 120 as viewed during a conventional eye exam. As can be seen in FIG. 1B, it can be difficult to view the peripheral retinal tear 105 using conventional eye exams. Due to the poor visibility during a conventional eye exam, peripheral retinal tears can be easily missed.

Referring to FIG. 1C, the peripheral retinal tear 105 is shown in peripheral retinal OCT image 125 as viewed using peripheral retinal OCT. Advantageously, through the described peripheral retinal OCT, the interior periphery of the eye can be imaged, and the peripheral retinal OCT image 125 can be created. As can be seen, the peripheral retinal OCT image 125 provides a much clearer view of the peripheral retinal tear 105.

Figure 2:
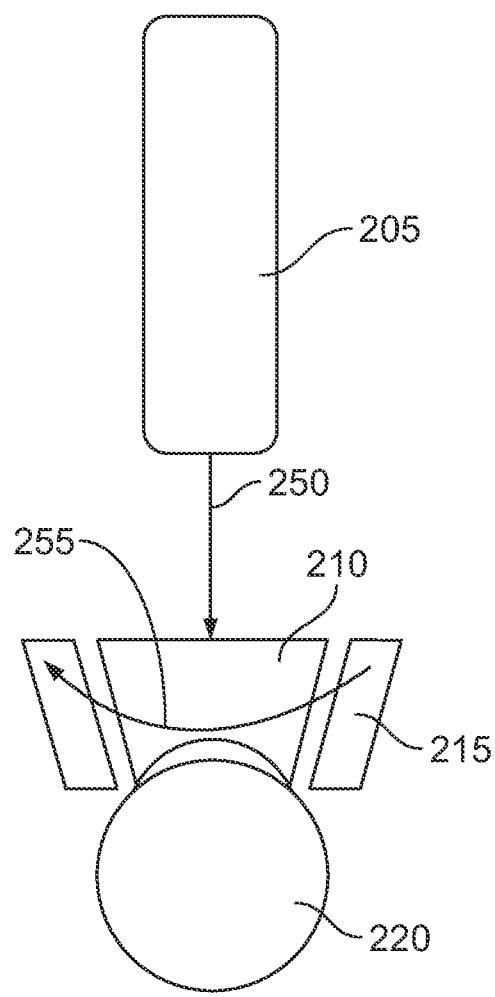
FIG. 2 illustrates a peripheral retinal OCT system in accordance with one embodiment of the present disclosure.

FIG. 2 illustrates a peripheral retinal OCT system in accordance with one embodiment of the present disclosure. Referring to FIG. 2, a peripheral retinal OCT system can include an OCT imaging device 205, a contact lens 210, and a contact lens housing 215. The system can also include a control system (e.g., control system 420 as described with respect to FIG. 4), an orientation system (e.g., orientation system 415 as described with respect to FIG. 4), and a robotics system (e.g., robotics system 425 as described with respect to FIG. 4). As shown, the system couples the image capture abilities of OCT with an angled mirror contact lens to allow for imaging of the peripheral retina.

The OCT imaging device can optically access the entire inner portion of an eye 220 through the specific geometry and orientation of the contact lens 210, as well as with beam steering capabilities of the OCT imaging device 205. The resulting images are then interpreted using image processing as described herein. Thus, the disclosed system can advantageously provide volumetric data from the peripheral retina in a manner that can visualize defects in the retina and note their anatomic position. The peripheral retinal OCT image can also provide visualization of the vitreoretinal attachment and preretinal tissue and changes in the vitreous and vitreoretinal interface, such as partial vitreous separation, along with traction to the preretinal tissue and/or retina.

In use, the contact lens 210 is placed on the eye 220 of a subject and directs a beam of light (shown simplistically as arrow 250) from the OCT imaging device 205 into the eye. The contact lens 210 includes refractive and reflective surfaces. In some embodiments, the contact lens 210 can include a single mirror of variable angulation. Alternately, the contact lens can comprise a series of mirrors at different angulations providing a contiguous or overlapping view of the peripheral retina (Equator to Ora Serrata) when viewed en face. These mirrors are of sufficient clarity and reflectance to allow the emitted OCT beam to reflect off the peripheral retina and back to the OCT detector via the mirror each way. An aqueous or viscous coupling gel or fluid can be used to facilitate contact with the patient cornea, reduce rotational resistance, and improve light transmission into the eye 220. Examples of the contact lens 210 are provided in FIGS. 3A and 3B.

The contact lens 210 can be placed into or integrated into a housing or holding fixture (e.g., the contact lens housing 215) to assist in positioning the contact lens 210. The contact lens 210 and/or the contact lens housing 215 are configured such that the orientation system (not shown) can determine the orientation of the contact lens 210, which can be communicated to the OCT imaging device 205. The OCT imaging device can subsequently display and orient the area of retina being captured. This can be accomplished through any suitable method for selecting and/or measuring angular position. Some examples include rotational sensors, precision gears, and visual-based systems including software.

In some cases, the orientation of the contact lens 210 is selected and/or measured using fiducial markings (not shown). These markings can be disposed on any suitable portion of the peripheral retinal OCT system, such as on the contact lens 210, on the contact lens housing 215, or on a mirrored surface.

The contact lens housing 215 can be a mechanical or motorized housing that allows for manual and/or automatic rotation of the contact lens 210. The contact lens 210 and/or mirror can rotate either in unison with the contact lens housing 215, or independent of it through a rotation mechanism (indicated by arrow 255). The rotation mechanism can be either manual or automatic (e.g., electrically powered), and it can be part of the contact lens housing 215 or external to the contact lens housing 215. The orientation of the contact lens 210 can be determined using devices such as accelerometers, gyrometers, inertial measurement units (IMUs), or other relative external spatial markers. This spatial information is then electronically communicated between the contact lens 210 and the OCT imaging device 205. This can be accomplished through any suitable method, such as through wireless communication (e.g., Wi-Fi, Bluetooth) or camera-based assessment. This spatial information can be recorded and stored along with the digital images.

In some cases, the contact lens 210 includes external markings on the contact lens 210 as reference points. When imaged with an alignment camera (not shown), the relative size, position, and angle of these markers indicate the position of the mirror within the contact lens 210 to automatically track the contact lens 210 position and rotation relative to the OCT imaging device 205. Using algorithms similar to those for pupil tracking, the OCT imaging beam is programmed to only scan on the contact lens mirror and thus the peripheral retina.

The OCT imaging device 205 includes at least a light source (not shown), a beam steering mechanism (not shown), and a focusing lens (not shown). The direction of the light beam is controlled by adjusting a steered position of the beam of light. Circumferential optical access can be obtained, at least in part, by adjusting a steered position of the beam of light. The axial position of the image focal plane can be adjusted through either refractive or reflective optics.

In some cases, the scanning pattern of the OCT imaging device 205 is adapted to circumferentially capture volumetric images of peripheral retina of the eye 220. This can be accomplished either through use of a single variably angled mirror or through montage of a series of mirrors. In some cases, the OCT imaging device 205 will circumferentially image the peripheral retina of the eye 220 either by tracking the movement of a rotating mirror within the contact lens 210 and/or by rotating the aim of the OCT imaging device 205 circumferentially along a continuous mirror within the contact lens 210.

In some cases, a system user interface (not shown) is provided. The user interface can display the scanning data in such a way that retinal pathology such as retina breaks, retinal detachment, retinoschisis, and other pathology can be visualized, and the entire circumferential peripheral retina of the eye 220 can be reviewed. The user interface can also include optional instructions, alerts, feedback, etc. for a user. These can be any type of signals, alerts, or other audio/visual aids to assist the user, including diagnostic information. Some examples include highlighting variations or irregularities in images of the retinal surface, or displaying a message to the user with pathology-specific guidance. The user interface can include any suitable format, such as software applications, input/output devices, touchscreens, display monitor, tablet, mobile devices, etc.

The images obtained from the OCT scan can be processed in a number of different ways. In an example embodiment, the OCT imaging device 205 and/or an associated processing system can collect multiple images, which are overlaid and montaged into a collective image. Because the images are digitally produced, the images from the system can also be sent to a remote location for review by an offsite physician or other professional.

To control the OCT imaging device 205, the positioning of the contact lens 210, the image processing, and other operational parameters, the peripheral retinal OCT system can also include a control system (not shown). The control system can take the form of hardware (including processors, memory devices, displays, etc.), software (including firmware, resident software, micro-code, etc.) or an embodiment combining software and hardware aspects.

The system can include a reference arm (not shown) to account for use of mirrored imaging system. The reference arm is operated by a control system that is capable of accounting for varying patient eye shapes. Additionally, the OCT imaging device 205 can be coupled to an automated image positioning system (not shown), such as a robot, to track and image the eye 220 through the contact lens 210.

It is to be noted that the disclosed system can also be used in conjunction with other image processing and medical procedures to enhance patient care. For example, the system can include a treating laser, such that the clinician, after detecting the pathology, can identify an area for treatment. A therapeutic laser can then be used on the patient using the same mirrored lens. In another example, the system can have automatic detection for retinal pathology using algorithms based on change in morphology, reflectance or a normative database. It is also possible to identify areas of interest and track these areas over time such than any changes in reflectance or morphology can be compared and measured. The system can further be used in an operating room or operating microscope OCT system for intraoperative use for examination and/or treatment, e.g., using the laser described above. One example application could be to provide inspection of peripheral surgical implants.

Figure 3A:
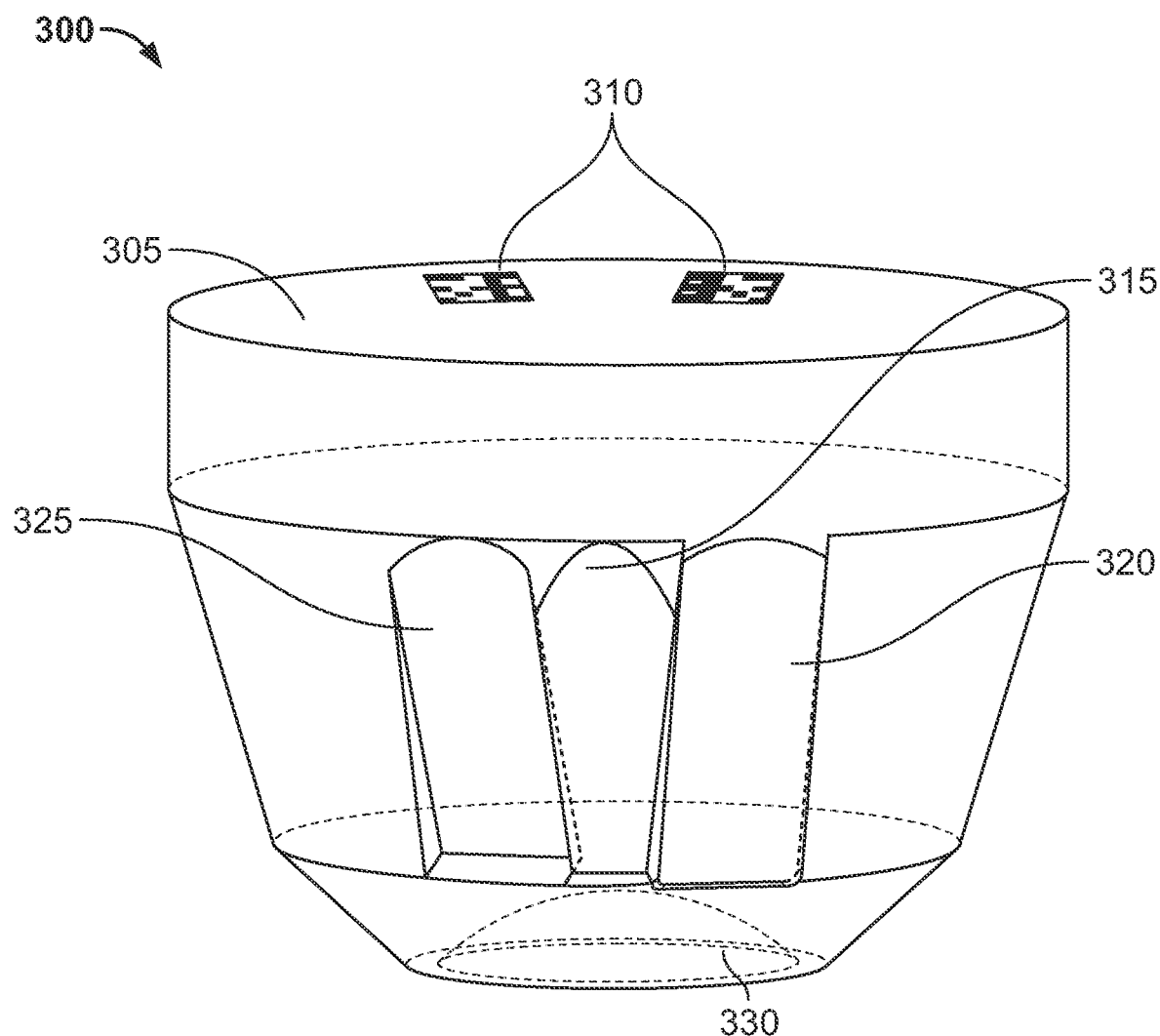
FIGS. 3A and 3B illustrate examples of a contact lens.
Figure 3B:
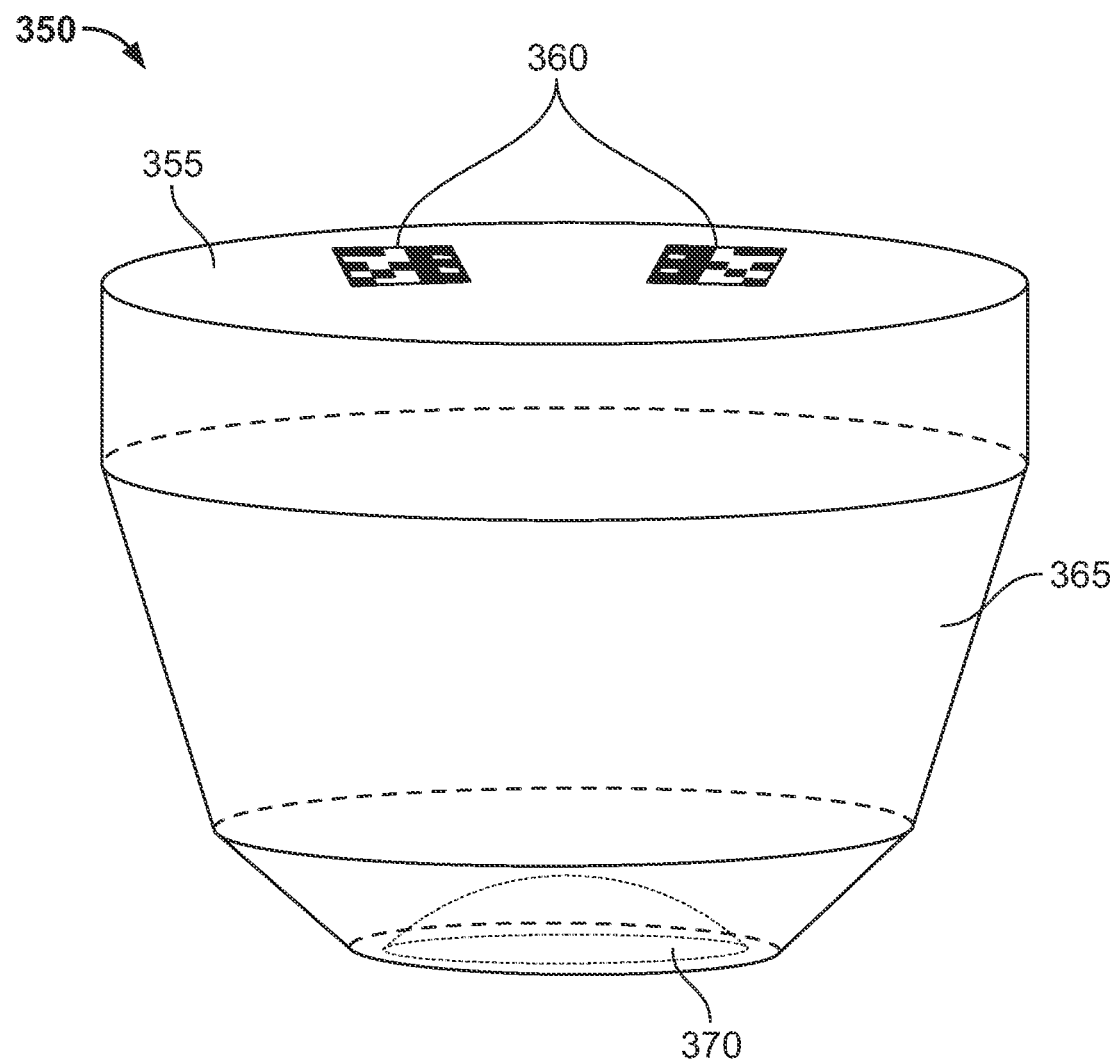

FIGS. 3A and 3B illustrate examples of a contact lens. Referring to FIG. 3A, a contact lens 300 can include an optical entrance 305 for an OCT imaging beam, a set of fiducial markers 310, a mirrored surface 315, a secondary mirrored surface 320, a tertiary mirrored surface 325, and an interface 330 for optical coupling with a cornea of an eye.

The optical entrance 305 for the OCT imaging beam can be flat, as shown in FIG. 3A, or curved. The set of fiducial markers 310 allow for a peripheral retina vision system (such as peripheral retinal vision system 410 as described with respect to FIG. 4) to estimate a three-dimensional position and rotation (e.g., X, Y, Z and pitch, yaw, roll) of the contact lens 300.

The contact lens 300 utilizes three adjacent mirrors (e.g., the mirrored surface 315, the secondary mirrored surface 320, the tertiary mirrored surface 325) each with a different tilt relative to the optical axis of an eye.

In some cases, three adjacent mirrors may be made smaller and copies of them may be placed around the entire contact lens 300. In the illustrative example of contact lens 300, the three adjacent mirrors are placed 20° apart relative to a central axis. In some cases, more or less tilts may be available.

The mirrored surface 315 allows for visualizing peripheral retina. The secondary mirrored surface 320 allows for visualizing more posterior peripheral retina. The tertiary mirrored surface 325 allows for visualizing more posterior peripheral retina. In the illustrative example, the mirrored surface 315 is angled at 70°, the secondary mirrored surface 320 is angled at 75°, the tertiary mirrored surface 325 is angled at 65°.

Referring to FIG. 3B, a contact lens 350 can include an optical entrance 355 for an OCT imaging beam, a set of fiducial markers 360, a mirrored surface 365, and an interface 370 for optical coupling with a cornea of an eye. In the illustrative example of FIG. 3B, the mirrored surface 365 is designed as single continuous surface.

The optical entrance 355 for the OCT imaging beam can be flat, as shown in FIG. 3A, or curved. The set of fiducial markers 360 allow for a peripheral retina vision system (such as peripheral retinal vision system 410 as described with respect to FIG. 4) to estimate a three-dimensional position and rotation (e.g., the six degrees of freedom—X, Y, Z and pitch, yaw, roll) of the contact lens 350.

Figure 4:
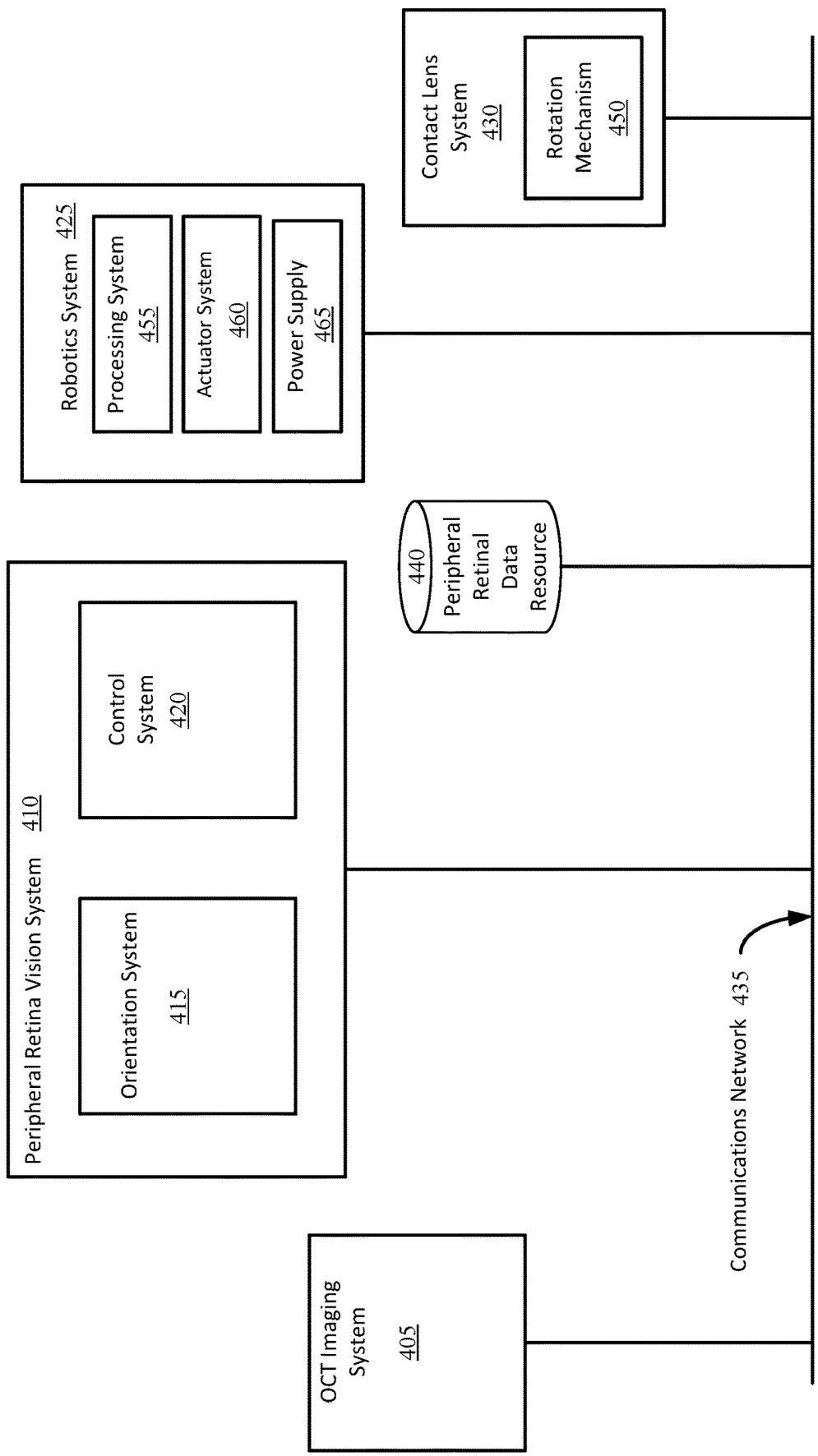
FIG. 4 illustrates an operating environment in which various implementations of peripheral retinal OCT may be carried out.

FIG. 4 illustrates an operating environment in which various implementations of peripheral retinal OCT may be carried out. Referring to FIG. 4, there can be communication between an OCT imaging system 405, a peripheral retinal vision system 410, an orientation system 415, a control system 420, a robotics system 425, and a contact lens system 430. The communication between the components may be over a communications network 435 The peripheral retinal vision system 410 can include or communicate with the orientation system 415 and the control system 420. In some cases, the peripheral retinal vision system 410 includes or communicates with one or more data resources, such as peripheral retinal data resource 440.

Figure 8:
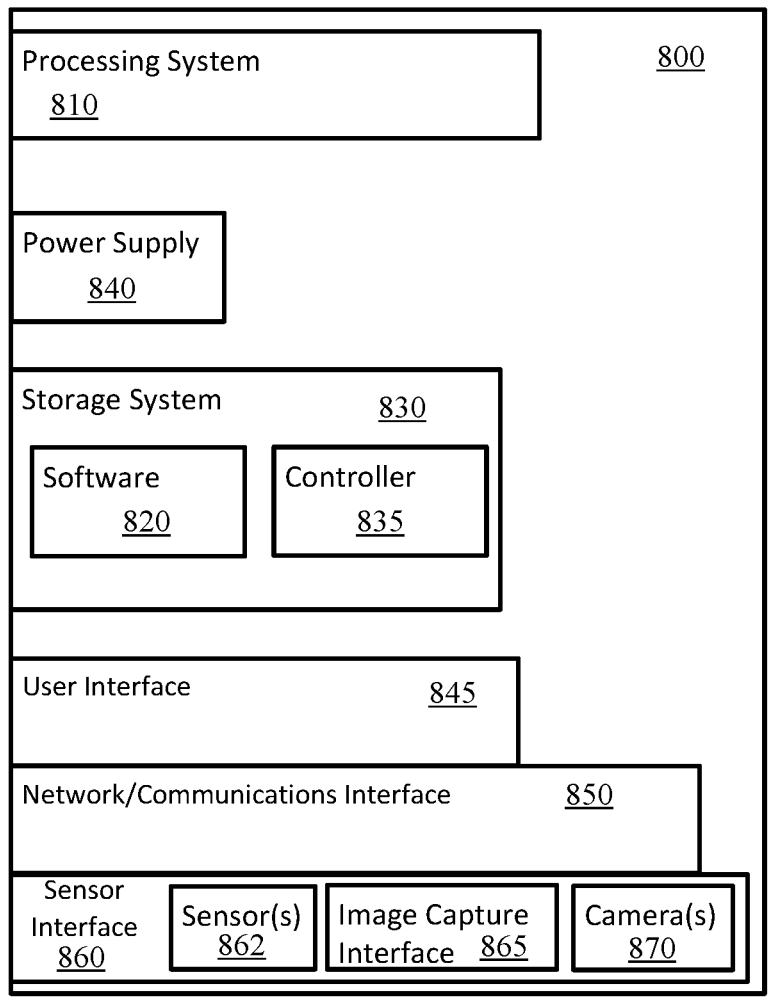
FIG. 8 illustrates components of an example computing system that may be used to implement certain methods and services described herein.

The peripheral retinal vision system 410 may be embodied with respect to computing system 800 as shown in FIG. 8. In some cases, the orientation system 415 and the control system 420 may be part of separate systems. For example, some or all of the features carried out by the orientation system 415 may be carried out at the OCT imaging system 405 and some or all of the features carried out by the control system 420 may be carried out at the peripheral retinal vision system 410.

The OCT imaging system 405 can be used to scan the eyes of a patient for the purpose of examining the peripheral retina. The OCT imaging system 405 may be any suitable OCT imaging system, including commercial OCT imaging systems. The OCT imaging system can include an OCT imaging device, such as OCT imaging device 205 described with respect to FIG. 2, a hand-held OCT imaging device, or a tabletop OCT imaging device. The OCT imaging system 405 includes a light source, a beam steering mechanism, OCT scanning mirrors, and a focusing lens. The OCT imaging system 405 can take individual depth profiles at a single point within the peripheral retina of an eye. Each OCT scan corresponds to a point in time and a position and provides volumetric data from the peripheral retina.

OCT uses low coherence light to capture cross-sectional scans of the retina with micron-scale resolution. Indeed, the volumetric OCT scan provides micron resolution three-dimensional data of the retinal layers. The volumetric OCT scan can include raster scans, radial scans, or spiral scans resulting in a volume. In some cases, the volumetric OCT scan is comprised of high-density OCT images. In some cases, the volumetric OCT scan is comprised of standard-quality OCT images from commercially available OCT imaging systems. In some cases, additional processing of the OCT scans is used to provide angiographic data (OCT angiography).

The contact lens system 430 can include a contact lens for placing on an eye. The contact lens, such as contact lens 210 described with respect to FIG. 2, contact lens 300 described with respect to FIG. 3A or contact lens 350 describe with respect to FIG. 3B, includes one or more angled mirrors. The contact lens can direct the beam of light from the OCT imaging system 405 into the eye of the subject.

The contact lens system 430 can include a contact lens housing, such as contact lens housing 215 described with respect to FIG. 2. The contact lens housing can be a mechanical or motorized housing that allows for manual and/or automatic rotation of the contact lens. The contact lens and/or mirror can rotate either in unison with the contact lens housing, or independent of it through a rotation mechanism 450. The rotation mechanism 450 can be either manual or automatic (e.g., electrically powered), and it can be part of the contact lens housing or external to the contact lens housing.

The orientation system 415 of the peripheral retinal vision system 410 can track the movement of the contact lens within the contact lens system 430. The orientation system 415 can determine positional data, such as position of the contact lens and an angle of the contact lens with respect to the OCT imaging system 405. The orientation system 415 can determine the three-dimensional position and rotation (e.g., along six axes, such as X axis, Y axis, Z axis and pitch, yaw, roll) of the contact lens.

The orientation of the contact lens can be determined using devices such as accelerometers, gyrometers, inertial measurement units (IMUs), or other relative external spatial markers, such as fiducial markers. The fiducial markings can be disposed on any suitable portion of the peripheral retinal OCT system, such as on the contact lens, on the contact lens housing, or on a mirrored surface.

The orientation system 415 may include one or more cameras configured to track a set of fiducial markers when in a field-of-view (FOV) of the one or more cameras of the orientation system 415. For example, the one or more cameras can capture a digital image of the surface of the contact lens having the fiducial markers, along with a timestamp of when the digital image was captured. In some cases, the positional data generated by the one or more cameras may be suitably processed by the orientation system 415 and output to the control system 420. In some cases, the positional data generated by the one or more cameras may be stored in the peripheral retinal data resource 440.

In some cases, the orientation system 415 can track the movement of the robotics system 425. In this case, the positional data can include a position and velocity of the robotics system 425. In some cases, the orientation system 415 can track the movement of the OCT imaging system 405. In this case, the positional data can include a position and velocity of the OCT imaging system 405.

The positional data can be electronically communicated to the control system 420. The communication of the positional data can be accomplished through any suitable method, such as through wireless communication (e.g., Wi-Fi, Bluetooth) or camera-based assessment. This positional data can be recorded and stored along with the digital images in the peripheral retinal data resource 440.

Based on positional data received from the orientation system 415, the control system 420 can control the OCT imaging system 405, the positioning of the contact lens of the contact lens system 430, the image processing, and other operational parameters. The control system 420 can take the form of hardware (including processors, memory devices, displays, etc.), software (including firmware, resident software, micro-code, etc.) or an embodiment combining software and hardware aspects.

In some cases, the control system 420 is operatively coupled to the robotics system 425 for controlling the movement of the robotic arm to move the OCT imaging system 405 to a position in accordance with embodiments of the present disclosure. Indeed, the control system 420 can control the robotics system 425 to move the OCT imaging system 405 to a position such that the OCT imaging system 405 is operable to image the peripheral retina based on the position of the contact lens system 430.

The OCT imaging system 405 can be coupled with the robotics system 425. The robotics system 425 can include a processing system 455, an actuator system 460, and, in some cases, a power supply 465. The processing system 455 can include one or more microprocessors. The actuator system 460 can include a robotic arm configured to move upwards, downwards, and/or side-to-side (i.e., along the x-, y-, z-axes) such that it can position and orient the OCT imaging system 405 in a suitable position and orientation for capturing OCT scans of the peripheral retina of the eye. In addition, the robotic arm may rotate the OCT imaging system 405 suitably about a pivot such that the OCT imaging system 405 is properly oriented for capturing OCT scans of the peripheral retina.

Figure 5:
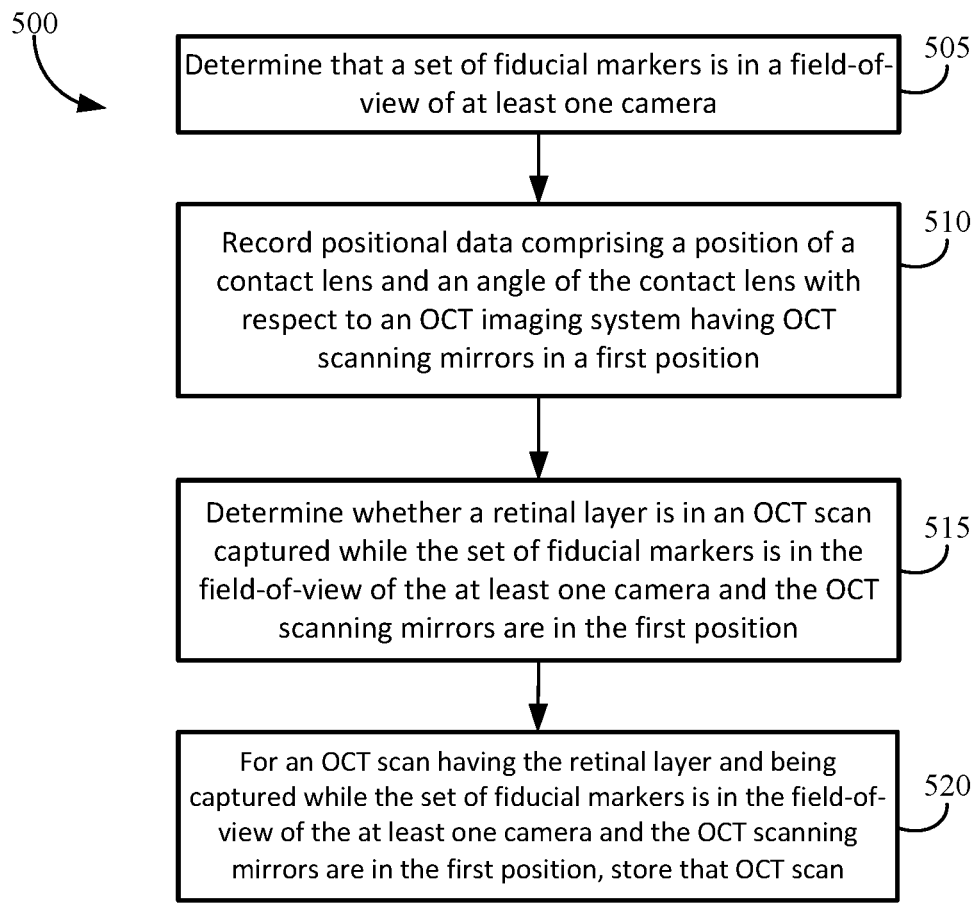
FIG. 5 illustrates a process flow diagram for capturing information used to generate a peripheral retinal OCT image according to an embodiment of the invention.

FIG. 5 illustrates a process flow diagram for capturing information used to generate a peripheral retinal OCT image according to an embodiment of the invention. A peripheral retinal vision system performing process 500 can be embodied with respect to computing system 800 as shown in FIG. 8.

Referring to process 500 of FIG. 5, the peripheral retinal vision system can determine (505) that a set of fiducial markers is in a field-of-view of at least one camera. An orientation system of the peripheral retinal vision system, such as orientation system 415 described with respect to FIG. 4, can include or communicate with the at least one camera. The at least one camera may be configured to track the set of fiducial markers when in the field-of-view of the at least one camera. The fiducial markings can be disposed on any suitable portion of a peripheral retinal OCT system, such as on a contact lens, on a contact lens housing, or on a mirrored surface.

In some cases, the peripheral retinal vision system captures a digital image of the set of fiducial markings within the field-of-view. For example, the at least one camera can capture a digital image of the surface of the contact lens having the fiducial markers, along with a timestamp of when the digital image was captured. The captured digital image can be stored in a peripheral retinal data resource, such as peripheral retinal data resource 440 described with respect to FIG. 4.

The peripheral retinal vision system can record (510) positional data comprising a position of a contact lens and an angle of the contact lens with respect to an OCT imaging system having OCT scanning mirrors in a first position. The positional data can be determined using devices such as accelerometers, gyrometers, inertial measurement units (IMUs). The positional data can be stored in the peripheral retinal data resource. In some cases, the positional data and the captured digital image are stored associated with each other.

The peripheral retinal vision system can determine (515) whether a retinal layer is in an OCT scan captured while the set of fiducial markers is in the field-of-view of the at least one camera and the OCT scanning mirrors are in the first position.

An OCT scan can be obtained by the peripheral retinal vision system and processed to determine whether a retinal layer is included in the OCT scan. The OCT scan can be obtained from an OCT imaging system. The OCT scan may be a one-dimensional vector, a two-dimensional image, or a three-dimensional volume.

Examples of the retinal layer include, but are not limited to, Bruch's membrane or a retinal pigment epithelium (RPE). Determining whether a retinal layer is in the OCT scan helps to confirm that correct part of the eye is being scanned.

For an OCT scan having the retinal layer and being captured while the set of fiducial markers is in the field-of-view of the at least one camera and the OCT scanning mirrors are in the first position, the peripheral retinal vision system can store (520) that OCT scan. The OCT scan can be stored in the peripheral retinal data resource.

Figure 6:
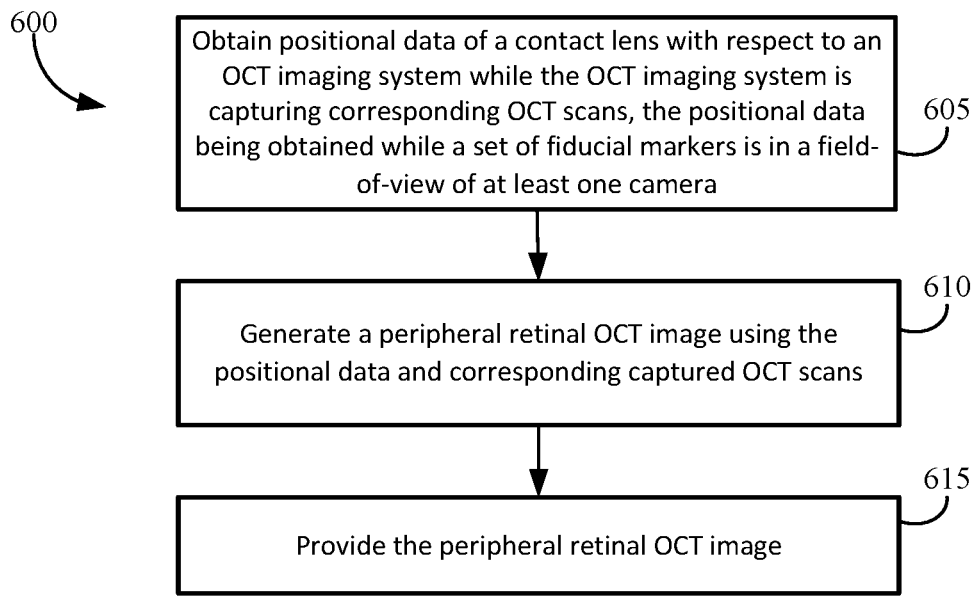
FIG. 6 illustrates a process flow diagram for generating a peripheral retinal OCT image according to an embodiment of the invention.

FIG. 6 illustrates a process flow diagram for generating a peripheral retinal OCT image according to an embodiment of the invention. A peripheral retinal vision system performing process 600 can be embodied with respect to computing system 800 as shown in FIG. 8.

Referring to process 600 of FIG. 6, the peripheral retinal vision system can obtain (605) positional data of a contact lens with respect to an OCT imaging system while the OCT imaging system is capturing corresponding OCT scans. The positional data can include a position of the contact lens and an angle of the contact lens with respect to the OCT imaging system. The positional data can be obtained while a set of fiducial markers is in a field-of-view of at least one camera. The OCT scans can include a one-dimensional vector, a two-dimensional image, or a three-dimensional volume. The OCT scans can be received from an OCT imaging system directly or can be received from a storage containing scans obtained from an OCT imaging system.

Advantageously, through the described systems and methods, the OCT imaging system can circumferentially scan the peripheral retina. To scan the entire peripheral retina, the contact lens and/or the OCT scanning mirrors must be adjusted. When the contact lens is rotated or the OCT scanning mirror is adjusted to a new position, the portion of the peripheral retina the OCT imaging system is scanning is different. This portion of the peripheral retina being scanned can be identified if the orientation of the contact lens is known.

Thus, each time the OCT imaging system captures an OCT scan, while the OCT imaging system circumferentially scans the peripheral retina of an eye, the positional data of the OCT imaging system and the contact lens is recorded and, in some cases, a digital image of the set of fiducial markers is captured. Using the positional data and the digital image, the orientation system of the peripheral retinal vision system can track the orientation and movement of the contact lens, thus allowing each portion of the peripheral retina to be identified as the OCT imaging system circumferentially scans the entire peripheral retina.

The peripheral retinal vision system can generate (610) a peripheral retinal OCT image using the positional data and corresponding captured OCT scans, the peripheral retinal OCT image allowing an entire circumferential peripheral retina of an eye to be viewed. The peripheral retinal OCT image can also provide visualization of the vitreoretinal attachment and preretinal tissue and changes in the vitreous and vitreoretinal interface, such as partial vitreous separation, along with traction to the preretinal tissue and/or retina.

In some cases, the peripheral retinal vision system can obtain digital images of the set of fiducial markers in the field-of-view of the at least one camera captured when the positional data was obtained. In this case, the peripheral retinal OCT image can be generated using the digital images of the set of fiducial markers along with the positional data and corresponding captured OCT scans.

The peripheral retinal vision system can provide (615) the peripheral retinal OCT image. The peripheral retinal OCT image can provide a 360° view of the retina, vitreous, vitreoretinal attachment, preretinal tissue, and vitreoretinal interface. The peripheral retinal OCT image can be a panoramic capture or a montaged image.

Figure 7:
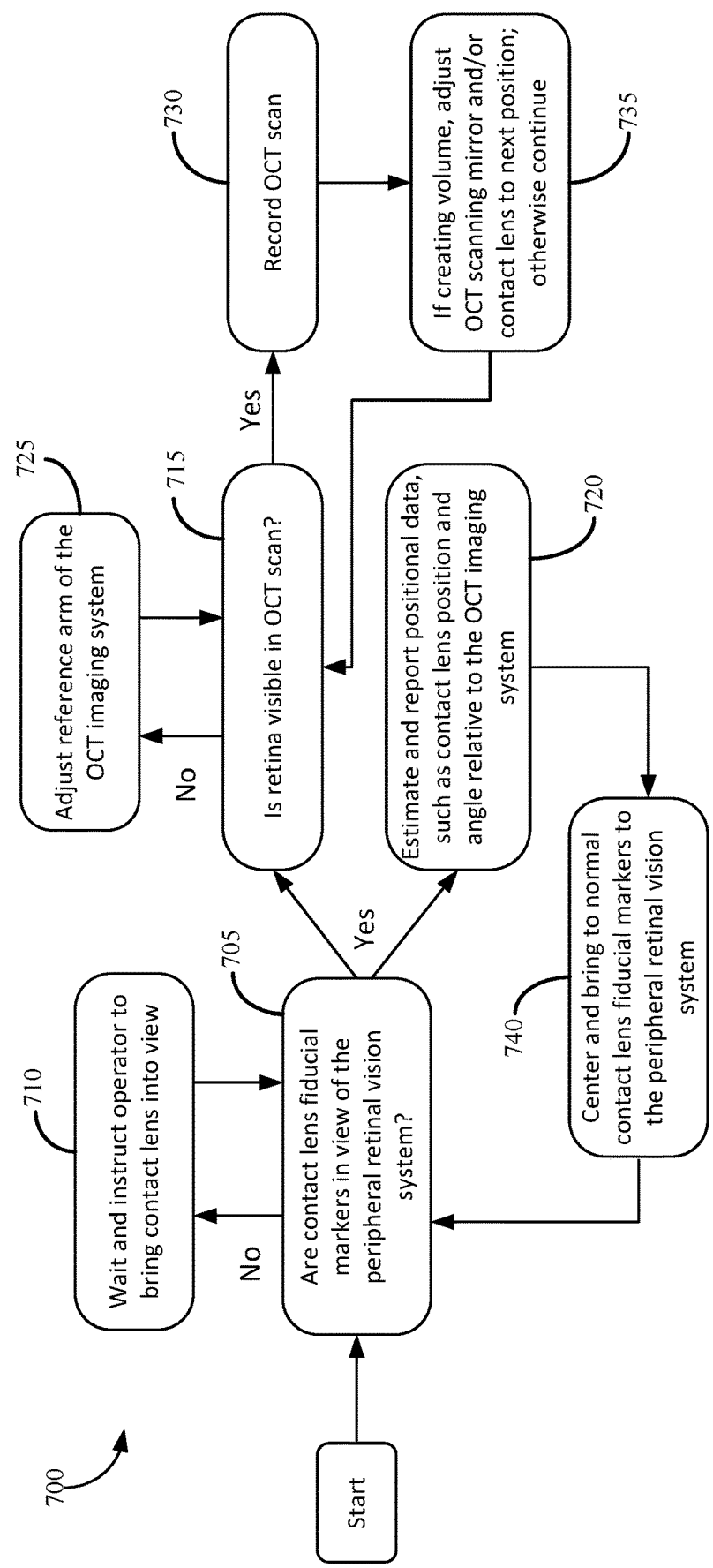
FIG. 7 illustrates a process flow diagram for capturing information used to generate a peripheral retinal OCT image according to an embodiment of the invention.

FIG. 7 illustrates a process flow diagram for capturing information used to generate a peripheral retinal OCT image according to an embodiment of the invention. Referring to process 700 of FIG. 7, a peripheral retinal vision system can determine whether contact lens fiducial markers are in a view of the peripheral retinal vision system, as reflected by flow 705. In some cases, the peripheral retinal vision system can determine the position of the OCT scanning mirrors, such as a first position.

The contact lens fiducial markers can be in a field-of-view of at least one camera of the peripheral retinal vision system. In some cases, the peripheral retinal vision system can capture and store a digital image of the set of fiducial markers in the field-of-view of the at least one camera.

When it is determined that the contact lens fiducial markers are not in the view of the peripheral retinal vision system, the peripheral retinal vision system can wait and instruct an operator to bring the contact lens into view, as reflected by flow 710.

When it is determined that the contact lens fiducial markers are in the view of the peripheral retinal vision system, the peripheral retinal vision system can determine if the retina (e.g., a retinal layer) is visible in the OCT scan, as reflected by flow 715, and estimate and report positional data, such as the contact lens position and angle relative to an OCT imaging system, as reflected by flow 720.

When it is determined that a retinal layer is not in the OCT scan captured while the set of fiducial markers is in the field-of-view of the at least one camera and the OCT scanning mirrors are in the first position, the peripheral retinal vision system can adjust a reference arm of the OCT imaging system to include the retinal layer in the captured OCT scan, as reflected by flow 725. In some cases, adjusting the reference arm of the OCT imaging system can include communicating with a robotics system to direct the robotics system to adjust the reference arm. In these cases, the positional data further includes a position of the robotics system and a velocity of the robotics system.

When it is determined that a retinal layer is in the OCT scan captured while the set of fiducial markers is in the field-of-view of the at least one camera and the OCT scanning mirrors are in the first position, the peripheral retinal vision system can record the OCT scan, as reflected by flow 730.

If the OCT scans are being used to create a volume, the peripheral retinal vision system can adjust the OCT scanning mirror and/or the contact lens to next position; otherwise continue, as reflected by flow 735.

In some cases, the peripheral retinal vision system adjusts the OCT scanning mirrors to a second position. In this case, adjusting the OCT scanning mirrors to the second position changes an area of visualization.

As an example, if the contact lens includes a series of angled mirrors, the peripheral retinal vision system can understand where those multiple mirrors are relative to the contact lens fiducial markers. Thus, the peripheral retinal vision system can communicate with the OCT imaging system to direct the beam to each of those angled mirrors by adjusting the OCT scanning minors. That is, the OCT imaging system moves the beam to one mirror, captures an OCT scan, and then directs the beam to the next mirror and captures the next scan until the entire peripheral retina is scanned. Here, the contact lens does not move while the OCT imaging system is scanning the peripheral retina.

As another example, the contact lens can include a single angled mirror that is 360 degrees around the contact lens. In this case, the OCT imaging system can rotate the beam around the single angled mirror while capturing OCT scans until the entire peripheral retina is scanned. Here, the contact lens does not move while the OCT imaging system is scanning the peripheral retina.

In the cases where the peripheral retinal vision system adjusts the OCT scanning mirrors to a second position, the peripheral retinal vision system can then determine that the set of fiducial markers is in the field-of-view; record the positional data comprising the position and an angle of the contact lens with respect with respect to the OCT imaging system having the OCT scanning mirrors in the second position; determine whether the retinal layer is in an OCT scan captured while the set of fiducial markers is in the field-of-view and the scanning mirrors are in the second position; and for an OCT scan having the retinal layer and being captured while the set of fiducial markers is in the field-of-view and the OCT scanning mirrors are in the second position, store that OCT scan.

In some cases, the peripheral retinal vision system adjusts the position of the contact lens to a second position. In this case, adjusting the position of the contact lens to the second position changes an area of visualization. The peripheral retinal vision system can adjust the position of the contact lens to the second position by causing a rotation mechanism to adjust the contact lens.

As an example, the contact lens can include a series of conical mirrors or a single lens in the shape of a polygon. The contact lens can be rotated around while the OCT imaging system stays in the same position. Here, since the angle of the mirror that directs the beam of light into the retina is changing, the OCT imaging system is able to scan the entire peripheral retina without adjusting the OCT scanning mirrors.

In the cases where the position of the contact lens is adjusted to a second position, the peripheral retinal vision system can then determine that the set of fiducial markers is in the field-of-view; record positional data comprising the second position of the contact lens and an angle of the contact lens with respect with respect to the OCT imaging system having the OCT scanning mirrors in the first position; determine whether the retinal layer is in an OCT scan captured while the set of fiducial markers is in the field-of-view of the at least one camera and the scanning mirrors are in the first position; and for an OCT scan having the retinal layer and being captured while the set of fiducial markers is in the field-of-view of the at least one camera and the OCT scanning mirrors are in the first position, store that OCT scan.

In some cases, the second position of the contact lens and/or OCT scanning mirrors is a predetermined position within a scanning pattern. The scanning pattern is a pattern used for scanning an entire circumferential peripheral retina of an eye.

After the peripheral retinal vision system estimates and reports the positional data, such as the contact lens position and angle relative to an OCT imaging system, as reflected by flow 720, the peripheral retinal vision system can center and bring to normal the contact lens fiducial markers to the peripheral retinal vision system, as reflected by flow 740.

FIG. 8 illustrates components of an example computing system that may be used to implement certain methods and services described herein. Referring to FIG. 8, system 800 may be implemented within a single computing device or distributed across multiple computing devices or sub-systems that cooperate in executing program instructions. The system 800 can include one or more blade server devices, standalone server devices, personal computers, routers, hubs, switches, bridges, firewall devices, intrusion detection devices, mainframe computers, network-attached storage devices, and other types of computing devices. The system hardware can be configured according to any suitable computer architectures such as a Symmetric Multi-Processing (SMP) architecture or a Non-Uniform Memory Access (NUMA) architecture.

System 800 includes a processing system 810 of one or more processors to transform or manipulate data according to the instructions of software 820 stored on a storage system 830. Examples of processors of the processing system 810 include general purpose central processing units, application specific processors, and logic devices, as well as any other type of processing device, combinations, or variations thereof. The processing system 810 may be, or is included in, a system-on-chip (SoC) along with one or more other components such as network connectivity components, sensor(s), video display components.

Processing system 810 may be implemented within a single processing device but may also be distributed across multiple processing devices or sub-systems that cooperate in executing program instructions.

Storage system(s) 830 can include any computer readable storage media readable by processing system 810 and capable of storing software 820. Storage system 830 may be implemented as a single storage device but may also be implemented across multiple storage devices or sub-systems co-located or distributed relative to each other. Storage system 830 may include additional elements, such as a controller 835, capable of communicating with processing system 810. Storage system 830 may also include storage devices and/or sub-systems on which data such as entity-related information is stored.

Software 820, including routines for performing processes, such as process 500 and process 600, may be implemented in program instructions and among other functions may, when executed by system 800 in general or processing system 810 in particular, direct the system 800 or processing system 810 to operate as described herein.

System 800 may represent any computing system on which software 820 may be staged and from where software 820 may be distributed, transported, downloaded, or otherwise provided to yet another computing system for deployment and execution, or yet additional distribution.

In embodiments where the system 800 includes multiple computing devices, the server can include one or more communications networks that facilitate communication among the computing devices. For example, the one or more communications networks can include a local or wide area network that facilitates communication among the computing devices. One or more direct communication links can be included between the computing devices. In addition, in some cases, the computing devices can be installed at geographically distributed locations. In other cases, the multiple computing devices can be installed at a single geographic location, such as a server farm or an office.

System 800 may optionally include power supply 840, which may be implemented as one or more batteries and/or an energy harvester (ambient-radiation, photovoltaic, piezoelectric, thermoelectric, electrostatic, and the like). Power supply 840 may further include an external power source, such as an AC adapter or a powered docking cradle that supplements or recharges the batteries.

System 800 can further include user interface system 845, which may include input/output (I/O) devices and components that enable communication between a user and the system 800. User interface system 845 can include input devices such as a mouse, track pad, keyboard, a touch device for receiving a touch gesture from a user, a motion input device for detecting non-touch gestures and other motions by a user, a microphone for detecting speech, and other types of input devices and their associated processing elements capable of receiving user input.

A network/communications interface 850 may be included, providing communication connections and devices that allow for communication between system 800 and other computing systems (not shown) over a communication network or collection of networks (not shown) or the air.

A sensor interface 860 may be included, providing devices and components that enable communication between one or more sensors 862 (e.g., optical sensor(s) and/or positional sensor(s)) and the system 800. An image capture interface 865 may be included within the sensor interface 860, providing components that enable an image, such as an OCT scan, to be captured. The sensor interface 860 and/or the image capture interface 865 enables an operation of one or more cameras 870 to record still digital images, video stream, and the like.

Certain methods and techniques set forth herein with respect to peripheral retinal OCT may be described in the general context of computer-executable instructions, such as program modules, executed by one or more computing devices including holographic enabled devices. Generally, program modules include routines, programs, objects, components, and data structures that perform particular tasks or implement particular abstract data types.

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

Embodiments may be implemented as a computer process, a computing system, or as an article of manufacture, such as a computer program product or computer-readable medium. Certain methods and processes described herein can be embodied as software, code and/or data, which may be stored on one or more storage media. Certain embodiments of the invention contemplate the use of a machine in the form of a computer system within which a set of instructions, when executed, can cause the system to perform any one or more of the methodologies discussed above. Certain computer program products may be one or more computer-readable storage media readable by a computer system and encoding a computer program of instructions for executing a computer process.

Computer-readable media can be any available computer-readable storage media or communication media that can be accessed by the computer system.

Communication media include the media by which a communication signal containing, for example, computer-readable instructions, data structures, program modules, or other data, is transmitted from one system to another system. The communication media can include guided transmission media, such as cables and wires (e.g., fiber optic, coaxial, and the like), and wireless (unguided transmission) media, such as acoustic, electromagnetic, RF, microwave and infrared, that can propagate energy waves. Although described with respect to communication media, carrier waves and other propagating signals that may contain data usable by a computer system are not considered computer-readable "storage media."

By way of example, and not limitation, computer-readable storage media may include volatile and non-volatile, removable and non-removable media implemented in any method or technology for storage of information such as computer-readable instructions, data structures, program modules or other data. Examples of computer-readable storage media include volatile memory such as random access memories (RAM, DRAM, SRAM); non-volatile memory such as flash memory, various read-only-memories (ROM, PROM, EPROM, EEPROM), phase change memory, magnetic and ferromagnetic/ferroelectric memories (MRAM, FeRAM), and magnetic and optical storage devices (hard drives, magnetic tape, CDs, DVDs). As used herein, in no case does the term "storage media" consist of carrier waves or propagating signals.

EXAMPLE

I. Ex Vivo Porcine Test

As an initial test, a peripheral retina in an ex vivo porcine eye was imaged using a Goldmann three-mirror lens and a research microscope integrated OCT (MIOCT) system. This OCT system was chosen over a typical clinical OCT system as it provides finer alignment and focus control over a conventional, clinical OCT system as well as the ability to perform manual tracking. The addition of manual tracking was necessary to maintain optical coupling between the OCT system and the handheld contact lens.

One skilled in the art will readily appreciate that the present disclosure is well adapted to carry out the objects and obtain the ends and advantages mentioned, as well as those inherent therein. The present disclosure described herein are presently representative of preferred embodiments, are exemplary, and are not intended as limitations on the scope of the present disclosure. Changes therein and other uses will occur to those skilled in the art which are encompassed within the spirit of the present disclosure as defined by the scope of the claims.

No admission is made that any reference, including any non-patent or patent document cited in this specification, constitutes prior art. In particular, it will be understood that, unless otherwise stated, reference to any document herein does not constitute an admission that any of these documents forms part of the common general knowledge in the art in the United States or in any other country. Any discussion of the references states what their authors assert, and the applicant reserves the right to challenge the accuracy and pertinence of any of the documents cited herein. All references cited herein are fully incorporated by reference, unless explicitly indicated otherwise. The present disclosure shall control in the event there are any disparities between any definitions and/or description found in the cited references.

Another embodiment of the present disclosure provides a method of providing eye treatment using the disclosed system and various embodiments described hereinabove. Eye treatment can include for example determination of retinal tears, monitoring of eye conditions, eye inspection, etc. These treatments are merely exemplary and not intended as limitations; other possible uses will be evident to a person of skill in the art.

The following Examples are provided by way of illustration and not by way of limitation. Certain aspects of the invention provide the following non-limiting embodiments:

Example 1. A method comprising: determining that a set of fiducial markers is in a field-of-view of at least one camera; recording positional data comprising a position of a contact lens and an angle of the contact lens with respect to an optical coherence tomography (OCT) imaging system having OCT scanning mirrors in a first position; determining whether a retinal layer is in an OCT scan captured while the set of fiducial markers is in the field-of-view of the at least one camera and the OCT scanning mirrors are in the first position; and for an OCT scan having the retinal layer and being captured while the set of fiducial markers is in the field-of-view of the at least one camera and the OCT scanning mirrors are in the first position, storing that OCT scan.

Example 2. The method of example 1, wherein, when it is determined that the retinal layer is not in the OCT scan captured while the set of fiducial markers is in the field-of-view of the at least one camera and the OCT scanning mirrors are in the first position, adjusting a reference arm of the OCT imaging system to include the retinal layer in the captured OCT scan.

Example 3. The method of example 2, wherein the adjusting of the reference arm of the OCT imaging system comprises communicating with a robotics system to direct the robotics system to adjust the reference arm, wherein the positional data further comprises a position of the robotics system and a velocity of the robotics system.

Example 4. The method of any of examples 1-3, wherein the set of fiducial markers are disposed on the contact lens, the method further comprising causing a rotation mechanism to adjust the contact lens having the set of fiducial markers.

Example 5. The method of any of examples 1-4, further comprising: capturing a digital image of the set of fiducial markers in the field-of-view of the at least one camera; and storing the digital image of the set of fiducial markers in the field-of-view of the at least one camera.

Example 6. The method of any of examples 1-5, further comprising: adjusting the OCT scanning mirrors to a second position, wherein adjusting the OCT scanning mirrors to the second position changes an area of visualization; determining that the set of fiducial markers is in the field-of-view; recording positional data comprising a position and an angle of the contact lens with respect with respect to the OCT imaging system having the OCT scanning mirrors in the second position; determining whether the retinal layer is in an OCT scan captured while the set of fiducial markers is in the field-of-view and the scanning mirrors are in the second position; and for an OCT scan having the retinal layer and being captured while the set of fiducial markers is in the field-of-view and the OCT scanning mirrors are in the second position, storing that OCT scan.

Example 7. The method of example 6, wherein the second position is a predetermined position within a scanning pattern, the scanning pattern is a pattern for scanning an circumferential peripheral retina of an eye.

Example 8. The method of any of examples 1-5, further comprising: adjusting the position of the contact lens to a second position, wherein adjusting the position of the contact lens to the second position changes an area of visualization; determining that the set of fiducial markers is in the field-of-view; recording positional data comprising the second position of the contact lens and an angle of the contact lens with respect with respect to the OCT imaging system having the OCT scanning mirrors in the first position; determining whether the retinal layer is in an OCT scan captured while the set of fiducial markers is in the field-of-view of the at least one camera and the scanning mirrors are in the first position; and for an OCT scan having the retinal layer and being captured while the set of fiducial markers is in the field-of-view of the at least one camera and the OCT scanning mirrors are in the first position, storing that OCT scan.

Example 9. A peripheral retinal optical coherence tomography (OCT) system for imaging an eye of a subject, comprising: an OCT imaging device comprising a light source, a beam steering mechanism, and a focusing lens; a contact lens for placing on the eye comprising one or more angled mirrors; and an orientation system for determining positional data comprising a position of the contact lens and an angle of the contact lens with respect to the OCT imaging device, which is in communication with the OCT imaging device, wherein the system is configured to visualize an internal periphery of the eye.

Example 10. The system of example 9, further comprising a contact lens housing.

Example 11. The system of examples 9 or 10 wherein the orientation system comprises fiducial markings, and wherein the markings are optionally disposed on the contact lens.

Example 12. The system of any of the examples 9-11, further comprising a control system for collecting and processing images.

Example 13. The system of any of the examples 9-12, further comprising a robotics system configured to position the OCT imaging device relative to the contact lens.

Example 14. The system of any of any of examples 9-13, wherein the contact lens comprises a single mirror of variable angulation.

Example 15. The system of any of examples 9-14, wherein the contact lens comprises at least two mirrors, each mirror of the at least two mirrors having a different angulation, the at least two mirrors providing a view of the internal periphery of the eye.

Example 16. A computer-readable storage medium having instructions stored thereon that, when executed by a processing system, perform a method comprising: obtaining positional data of a contact lens with respect to an optical coherence tomography (OCT) imaging system while the OCT imaging system is capturing corresponding OCT scans, the positional data being obtained while a set of fiducial markers is in a field-of-view of at least one camera; generating a peripheral retinal OCT image using the positional data and corresponding captured OCT scans, the peripheral retinal OCT image allowing an circumferential peripheral retina of an eye to be viewed; and providing the peripheral retinal OCT image.

Example 17. The medium of example 16, wherein the method further comprises: obtaining digital images of the set of fiducial markers in the field-of-view of the at least one camera captured when the positional data was obtained, wherein the generating of the peripheral retinal OCT image uses the digital images of the set of fiducial markers along with the positional data and corresponding captured OCT scans.

Example 18. The medium of examples 16 or 17, wherein the OCT scan comprises a one-dimensional vector, a two-dimensional image, or a three-dimensional volume.

Example 19. The medium of any of the examples 16-18, wherein the positional data comprises a position of the contact lens and an angle of the contact lens with respect to the OCT imaging system.

Example 20. The medium of any of examples 16-19, wherein the positional data further comprises a position of a robotics system and a velocity of the robotics system.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A peripheral retinal optical coherence tomography (OCT) system for imaging an eye of a subject, comprising:
an OCT imaging device;
a rotatable contact lens for placing on the eye comprising one or more angled contact lens mirrors; and
an orientation system for determining orientation data comprising a three-dimensional position of the rotatable contact lens and a three-dimensional rotation of the rotatable contact lens with respect to the OCT imaging device, the orientation system configured to be in communication with the OCT imaging device;
wherein the peripheral retinal OCT system is configured to allow the OCT imaging device to visualize an internal periphery of the eye.

2. The peripheral retinal OCT system of claim 1, further comprising a contact lens housing coupled to the rotatable contact lens, the contact lens housing configured to allow the rotatable contact lens to rotate independently of the OCT imaging device.

3. The peripheral retinal OCT system of claim 1, wherein the rotatable contact lens comprises fiducial markings, and wherein the orientation system is optically coupled to the rotatable contact lens.

4. The peripheral retinal OCT system of claim 1, further comprising a control system operatively coupled to the OCT imaging device.

5. The peripheral retinal OCT system of claim 1, further comprising a robotics system configured to position the OCT imaging device relative to the rotatable contact lens.

6. The peripheral retinal OCT system of claim 1, wherein the one or more angled contact lens mirrors comprises a single angled contact lens mirror of variable angulation.

7. The peripheral retinal OCT system of claim 1, wherein the one or more angled contact lens mirrors comprises at least two angled contact lens mirrors, each angled contact lens mirror of the at least two angled contact lens mirrors having a different angulation, each of the at least two angled contact lens mirrors providing a different view of the internal periphery of the eye.

8. The peripheral retinal OCT system of claim 2, wherein the contact lens housing comprises a sensor configured to detect the three-dimensional rotation of the rotatable contact lens, wherein the orientation system is in communication with the contact lens housing.

9. A method comprising:
recording orientation data comprising a three-dimensional position of a rotatable contact lens and a three-dimensional rotation of the rotatable contact lens with respect to an optical coherence tomography (OCT) imaging system; and
determining whether a retinal layer is in an OCT scan captured by the OCT imaging system.

10. The method of claim 9, wherein, when it is determined that the retinal layer is not in a first OCT scan captured by the OCT imaging system, adjusting a reference arm of the OCT imaging system to include the retinal layer in a second OCT scan captured by the OCT imaging system.

11. The method of claim 10, wherein the adjusting of the reference arm of the OCT imaging system comprises directing a robotics system to adjust the reference arm,
wherein the orientation data further comprises a position of the robotics system and a velocity of the robotics system.

12. The method of claim 9, wherein, during determining whether the retinal layer is in the OCT scan captured by the OCT imaging system, it is determined that the retinal layer is not in a first OCT scan captured by the OCT imaging system while OCT scanning mirrors of the OCT imaging system are in a first OCT scanning mirror position, the method further comprising:
adjusting the OCT scanning mirrors to a second OCT scanning mirror position, wherein adjusting the OCT scanning mirrors to the second OCT scanning mirror position changes an area of visualization; and
determining whether the retinal layer is in a second OCT scan captured by the OCT imaging system while the OCT scanning mirrors are in the second OCT scanning mirror position.

13. The method of claim 9, further comprising using the orientation data to allow the OCT imaging system to circumferentially scan an entire peripheral retina of an eye.

14. The method of claim 9, further comprising using the OCT scan to detect retinal pathology.

15. The method of claim 14, further comprising treating the retinal pathology using a treatment laser and the rotatable contact lens.

16. The method of claim 9, further comprising adjusting the rotatable contact lens to at least one of a second three-dimensional rotation and a second three-dimensional position.

17. The method of claim 16, further comprising:
recording orientation data comprising the at least one of the second three-dimensional position of the rotatable contact lens and the second three-dimensional rotation of the rotatable contact lens with respect to the OCT imaging system; and
determining whether the retinal layer is in a second OCT scan captured by the OCT imaging system.

18. A computer-readable storage medium having instructions stored thereon that, when executed by a processing system, perform a method comprising:
obtaining orientation data comprising a three-dimensional position of a rotatable contact lens and a three-dimensional rotation of the rotatable contact lens with respect to an optical coherence tomography (OCT) imaging system while the OCT imaging system is capturing corresponding OCT scans;
generating a peripheral retinal OCT image using the orientation data and corresponding captured OCT scans, the peripheral retinal OCT image allowing a peripheral retina of an eye to be viewed.

19. The medium of claim 18, wherein the method further comprises:
obtaining digital images of a set of fiducial markers in a field-of-view of at least one camera,
wherein the generating of the peripheral retinal OCT image uses the digital images of the set of fiducial markers along with the orientation data and corresponding captured OCT scans.

20. The medium of claim 18, the method further comprising:
automatically detecting a feature of the peripheral retinal OCT image;

providing for display the peripheral retinal OCT image; and providing for display an alert based on the automatically detected feature of the peripheral retinal OCT image.

* * * * *